(12) United States Patent
Jezierski et al.

(10) Patent No.: US 7,779,043 B2
(45) Date of Patent: Aug. 17, 2010

(54) EXTENSIBLE MECHANISM FOR OBJECT COMPOSITION

(75) Inventors: Eduardo A. Jezierski, Sammamish, WA (US); Peter G. Provost, Sammamish, WA (US); Bradley J. Wilson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 11/321,209

(22) Filed: Dec. 29, 2005

(65) Prior Publication Data

US 2007/0083551 A1    Apr. 12, 2007

Related U.S. Application Data

(60) Provisional application No. 60/724,324, filed on Oct. 6, 2005.

(51) Int. Cl.
*G06F 17/30* (2006.01)

(52) U.S. Cl. ...................................... 707/802

(58) Field of Classification Search ........................ None
See application file for complete search history.

(56) References Cited

U.S. PATENT DOCUMENTS

| | | | |
|---|---|---|---|
| 5,875,333 A | | 2/1999 | Fish |
| 5,890,158 A | | 3/1999 | House et al. |
| 5,937,189 A | * | 8/1999 | Branson et al. ............. 717/101 |
| 6,104,874 A | * | 8/2000 | Branson et al. ............. 717/108 |
| 6,199,195 B1 | * | 3/2001 | Goodwin et al. ............. 717/104 |
| 6,366,921 B1 | * | 4/2002 | Hansen et al. .......... 707/103 R |
| 6,574,736 B1 | | 6/2003 | Andrews |
| 7,152,228 B2 | * | 12/2006 | Goodwin et al. ............. 717/146 |
| 7,546,226 B1 | * | 6/2009 | Yeh et al. ....................... 703/2 |
| 2005/0172018 A1 | * | 8/2005 | Devine et al. ............... 709/223 |
| 2009/0271158 A1 | * | 10/2009 | Yeh et al. ....................... 703/2 |

OTHER PUBLICATIONS

Collier, Nick, "RePast: An Extensible Framework for Agent Simulation," 2003, Social Science Research Computing, University of Chicago, pp. 1-18.*
Payette, Sandra et al., Flexible and Extensible Digital Object and Repository Architecture (FEDORA), 1998, Department of Computer Science—Cornell University, ECDL'98, pp. 41-60.*
Schmidt, Douglas, et al., "Experiences with an Object-Oriented Architecture for Developing Dynamically Extensible Distributed Management Software," 1994, IEEE Proceedings of the Conference on Global Communications, pp. 500-506.*
Manolescu, Dragos, "An Extensible Workflow Architecture with Objects and Patterns," IEEE TOOLSEE'01, 2001, pp. 1-12.*

(Continued)

*Primary Examiner*—Neveen Abel Jalil
*Assistant Examiner*—Farhan M Syed
(74) *Attorney, Agent, or Firm*—Workman Nydegger

(57) ABSTRACT

An extensible framework for object oriented programming comprises a reception component that receives a customized strategy relating to composing a target object. An implementation component automatically implements the customized strategy to compose the target object based at least in part upon context associated with the target object. The extensible framework can further comprise a context component that determines the context, including context of an application associated with the target object, existing objects associated with the target object, and relationships between the existing objects.

15 Claims, 15 Drawing Sheets

OTHER PUBLICATIONS

Hummes, Jakob., et al, "Design of Extensible Component-Based Groupware," Mar. 2000, SpringLink, vol. 9, No. 1, pp. 53-74.*

Guerraoui, Rachid et al., "Strategic Directions in Object-Oriented Programming," Dec. 1996, ACM Computing Surveys, vol. 28, Iss. 4, pp. 691-700.*

Zenger, Mathias, et al., "Independently Extensible Solutions to the Expression Problem," 2004, Technical Report 2004/33, pp. 1-11.*

International Search Report dated Feb. 26, 2007 for International Application No. PCT/US2006/035390, 4 pages.

European Search Report dated Dec. 8, 2008 for European Patent Application Serial No. 06 814 480.7, 1 Page.

* cited by examiner

EXTENSIBLE MECHANISM FOR OBJECT COMPOSITION

CROSS REFERENCE TO RELATED APPLICATION

This application claims the benefit of U.S. Provisional Patent Application No. 60/724,324, filed on Oct. 6, 2005, and entitled "EXTENSIBLE MECHANISM FOR OBJECT COMPOSITION." The entirety of this application is incorporated herein by reference.

BACKGROUND

Advancements in computing technologies have enabled transformation of computers from high-cost, low functionality devices that could be employed for basic mathematical calculations to low-cost, high functionality devices that can be utilized for word-processing, instantaneous communications between friends and family, bill payment, entertainment, and the like. To enable this leap in functionality over a relatively short period of time, size of transistors has been greatly reduced, thereby enabling integrated circuits to be associated with significant amounts of memory as well as increased processing speed (due to a number of transistors that can be located on a single integrated circuit). These advancements in turn have led to creation of more robust and flexible programming environments, which are employed by computer programmers to generate applications and/or improve existing applications. In more detail, a plurality of programming languages now exist, where a programmer can select a particular language based on familiarity and/or functionality associated with a selected language.

In more detail, programming languages are formal languages employed specifically to communicate instructions to computers or microprocessors for task execution. Through the years, object oriented programming has become one of many familiar and popular models designers and programmers utilize to implement functionality within computer systems. Object oriented programming is unique from other programming languages because it is premised on viewing programming in terms of objects or things rather than actions like other models.

The benefit of object technology arises out of three basic principles: encapsulation, polymorphism and inheritance. Objects hide or encapsulate the internal structure of their data and associated methods. Instead of exposing implementation details, objects present interfaces that represent their abstractions cleanly without extraneous information. Polymorphism takes encapsulation one-step further. Polymorphism allows the use of the same code for different data types—the idea being many shapes, one interface. Hence, a software component can make a request of another component without knowing exactly what that component is. The component that receives the request interprets it and figures out according to its variables and data how to execute the request. The third principle is inheritance, which enables developers to reuse pre-existing design and code. This capability allows developers to avoid creating all software from scratch. Rather, through inheritance, developers can derive subclasses that inherit and modify both state and behaviors of other classes.

The object oriented programming model is often defined via a class-based approach. In this system, objects are entities including both state and behavior. Both the state and behavior of an object are defined by a class, which identifies objects of a particular type. An object created based on a class definition is considered an instance of that class reflected in a dynamic type. Thus, a class specifies the data (e.g., state) that the object can contain as well as methods, functions, or behaviors that the object can perform. Methods operate to modify the internal state of the associated objects by altering the data contained therein. The combination of such data and methods in objects is often referred to as encapsulation in object-oriented programming. Encapsulation provides for the state of an object to be changed only by well-defined methods associated with the object. When the behavior of an object is confined to such well-defined locations and interfaces, changes (e.g., code modifications) in the object will have minimal impact on the other objects and elements in the system.

A current deficiency associated with object oriented programming is that it is difficult to automatically create a new object based upon existing objects, application context, and the like, and it is further difficult to modify existing objects (e.g., modify relationships between existing objects). Rather, a skilled programmer may be forced to generate a plurality of additional objects, wherein each object is utilized for disparate contexts. Existing frameworks for object-oriented programming do not allow customized strategies to be implemented in connection with composing objects.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Described herein is an extensible framework that can be employed in connection with composing one or more objects associated with an application, wherein the objects conform to object oriented programming. In contrast to conventional frameworks, the claimed framework described below enables user-creation and implementation of various composition strategies. The term composition as used herein refers to creation of a new object, defining relationships associated with the new object, defining relationships associated with existing objects, and the like. Composing an object can involve several specific examples, such as creating a new object instance in memory by invoking an adequate object initializer, establishing relationships between the object and other new or existing objects, modifying an internal object state or invoking methods on the internal state, etc. A composition conceptually involves a target object and a context, wherein the context is a term utilized to represent existing entities in an application. For instance, these entities can include existing object instances, policy and type definitions, configuration of the application, etc. Based upon the context, various strategies can be implemented in particular orders to compose one or more objects.

In more detail, a composition strategy can be responsible for one particular style or portion of a composition. A composition strategy may be dependent upon execution of a different composition strategy or a series of disparate composition strategies before, during, or after execution of such strategy (to enable the composition strategy to complete its task). Thus, it can be discerned that the behavior of a composition strategy is determined solely by its implementation. Furthermore, composition strategies can (but are not required to) enable external entities to alter their behavior (temporarily or permanently) via one or more policies that can be provided by programmatic, declarative, or configuration-based means. These composition strategies can be generated by one or more programmers and applied to an application at run-time, wherein composition strategies are executed based upon the determined context. Furthermore, the composition strategies can be executed in a particular order based upon the determined context. For instance, composition strategies can be run as a chain of sequential composition strategies classified into stages—thus, multiple strategies can act on a same object and context. Furthermore, strategies can be executed in parallel if the context and application require.

In a specific example, an application can be deployed, wherein such application is written by way of object oriented programming. After the application is written, it may be desirable to compose particular objects within such application. Accordingly, composition strategies can be generated relating to such composition, wherein the composition strategies do not affect the application or context. At run-time of the application, the composition strategies can be executed and objects can be composed according to the composition strategies and a determined context.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
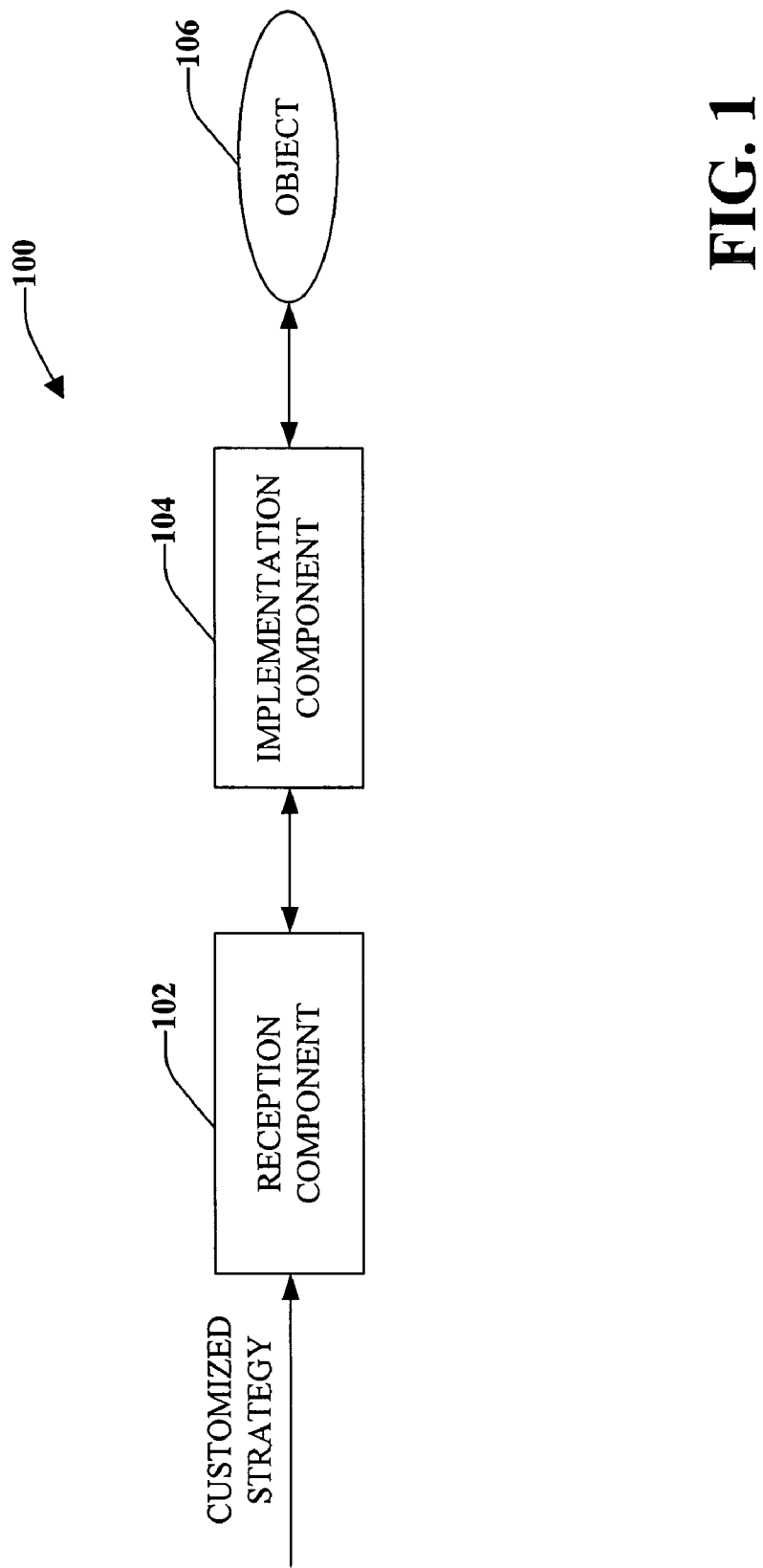
FIG. 1 is a high-level block diagram of a system that facilitates composing an object given particular customized strategies.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The claimed subject matter will now be described with respect to the drawings, where like numerals represent like elements throughout. Referring now to FIG. 1, an extensible object composition system 100 is illustrated. Composition of an object conceptually involves acting on a target object based at least in part upon a context associated with such target object. The context can be defined as existing entities in a particular application as well as relationships between such entities, and the target object can be defined as an object that is being composed in such context. Composition as used herein can include creating an object (e.g., the target object) and generating relationships with respect to such object, receiving an existent object (the target object) and creating relationships between the existent object and other objects, deleting existing relationships associated with the target object, altering relationships associated with the target object, etc. The composition with respect to a target object can be undertaken through utilization of one or more customized composition strategies, wherein a framework associated with implementing the composition strategies enables addition of new composition strategies as well as defining use of such strategies.

Still more specifically, the system 100 includes a reception component 102 that receives a customized composition strategy, wherein the composition strategy can be received from a user, a program, from memory, a hard disk, or any other suitable location. The customized composition strategy can be one of several strategies that are received by the reception component 102, and can include any suitable actions that may be undertaken with respect to composing an object. For example, the customized composition strategy can relate to creating a new object instance in memory by invoking an adequate object initializer, establishing relationships between an object and other new or existing objects within a particular context, modifying internal object state, invoking methods on an object, acting on other objects within a context without acting on the target object itself, among others. It is to be understood that this listing of actions that may be associated with the customized composition strategy is exemplary in nature and not limitative. The received composition strategy can be responsible for one particular style of composition, and can rely on other associated composition strategies to run before the customized composition strategy, after the customized composition strategy, and/or during the customized composition strategy to enable proper execution of the received customized composition strategy. Thus, the behavior of the composition strategy can be determined solely by implementation, and can (but is not required to) allow external entities to alter its behavior temporarily or permanently by way of policy. These policies can be provided by programmatic, declarative, or configuration-based means.

The customized composition strategy can be relayed from the reception component 102 to an implementation component 104, wherein the implementation component 104 utilizes such composition strategy in connection with composing an object 106. For instance, the implementation component 104 can be called by an application at run-time, and the application can request particular customized composition strategies as well as specify default policies associated therewith. The reception component 102 can thereafter receive such composition strategies. The context (described above) can then be ascertained and provided to the implementation component 104, wherein the context includes a set of entities in the application—for example, existing object instances, policy and type definitions, configuration of the application, and the like. Based at least in part upon the context and the application call, the implementation component 104 can compose the object 106. Accordingly, it can be discerned that the system 100 enables extensibility with respect to a composition, as composition strategies that are utilized to implement the composition can be independently built and utilized without requiring alteration to a consuming application or other composition strategies. In other words, within a particular context several rules exist, and utilizing such rules objects can be created and wired together with one call, wherein the rules are extensible and policy-driven. An analogy to the system 100 would be a factory line, wherein the system 100 enables provision of additional portions to the line at the will of a user. These portions (strategies) can then be consumed and employed by an application at runtime, wherein a context associated with the application can determine which composition strategies to employ, which policies to employ, ordering of composition strategies, and the like.

In a still more particular example that illustrates benefits of the system 100, it may be desirable to wire-up several objects associated with an application in a substantially similar manner, wherein such wire-up is desirably customized. Contrary to static systems, the system 100 enables creation of a customized composition strategy or strategies and implementation of such composition strategies without requiring alteration of the application or alteration of other composition strategies. In more detail, an individual may wish that wire-ups were complete with respect to several objects associated with an application. In conventional systems, if a composition strategy were not provided with the system, then wiring-up would need to be done manually for each object. The system 100, however, enables provision of a customized strategy that performs the desired wire-up and automatically performs the wire-up on appropriate objects (which can be determined by the context). For instance, the appropriate customized strategy can be created by a programmer, provided to the reception component 102 at run-time of an application, and then implemented by the implementation component 104 based upon a context.

Figure 2:
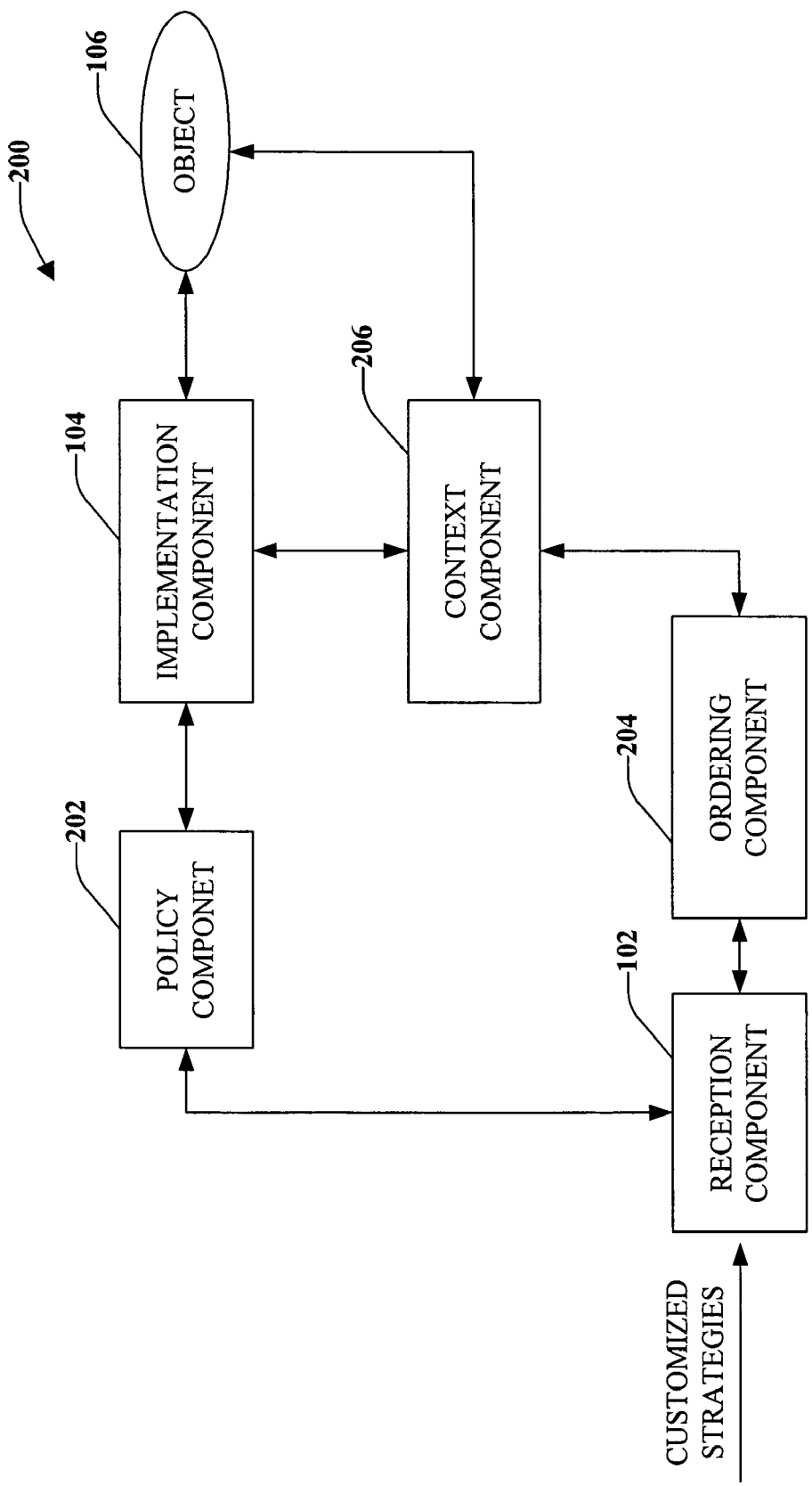
FIG. 2 is a block diagram of a system that facilitates employing multiple strategies to compose a target object, wherein an order of the strategies is based at least in part upon a determined context.

Turning now to FIG. 2, a system 200 that facilitates object composition by way of composition strategies provided through an extensible framework is illustrated. The system 200 includes the reception component 102 that receives a plurality of customized composition strategies, wherein such composition strategies relate to composing at least the target object 106. As described above, composition can relate to various specific actions, including creating object instances in memory, establishing relationships between objects, modifying internal object states, acting on various objects in a context, and the like. The reception component 102 can be associated with a policy component 202 that defines and implements policies with respect to each of the plurality of customized composition strategies. For instance, the policies can be permanent or temporary. Permanent policies remain constant between multiple composition executions, while temporary policies exist only for a single execution of the system 200. The policy component 202 enables an application to specify which composition strategies are needed as well as specify default policies. Additionally, the policy component 202 can define policies with respect to the customized composition strategies based at least in part upon programmatic, declarative, or configuration-based commands. Furthermore, temporary policies can be employed to either override or extend policies associated specifically with the customized composition strategies. Moreover, the policy component 202 can alter policies associated with the strategies between calls related to the target object 106. This flexibility is unattainable in conventional systems.

The reception component 102 can further be associated with an ordering component 204 that describes an order in which the plurality of customized composition strategies are to be implemented. Further, the ordering component 204 can be associated with a context component 206 that provides the ordering component 204 with a context relating to the object 106. As stated above, the context can include entities in an application that includes the target object 106, such as existing object instances, policy and type definitions, configuration of the application, etc. Furthermore, existing object instances can be local or remote, wherein the term "remote"

refers to objects in another computer, network, process, and the like. The context component 206 can determine the context and provide it to the ordering component 204, which utilizes the context to determine an order in which the composition strategies are to be applied (to effectuate composition of the target object 106). The ordering component 204 can also receive declarative or programmatic statements relating to an order. Furthermore, the ordering component 204 can cause composition strategies to operate in parallel if desired.

The determined context and the order of composition strategies can then be provided to the implementation component 104, which causes the strategies to execute in a particular order at run-time of the application. Accordingly, it can be determined that a flexible and robust object composition system is enabled through the components described in such figure.

Figure 3:
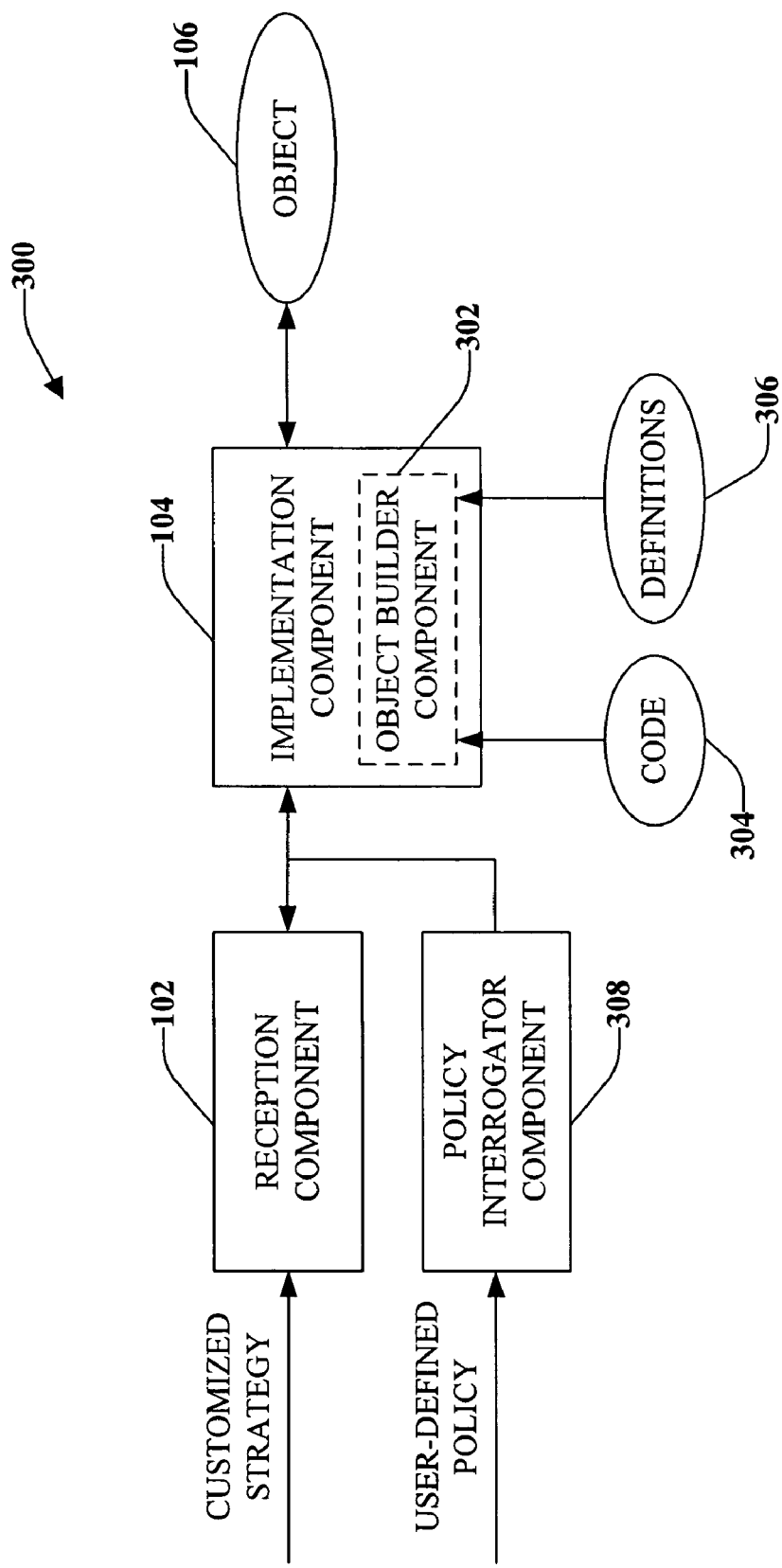
FIG. 3 is a block diagram of an extensible programming framework.

Now referring to FIG. 3, an exemplary system 300 that utilizes one or more aspects described above in connection with composing the target object 106 is illustrated. The system 300 includes the reception component 102 which receives one or more customized composition strategies. In the exemplary system 300, the composition strategy received by the reception component 102 can relate to building the target object 106. The reception component 102 is associated with the implementation component 104, which can implement the received strategy with respect to the target object 106. The implementation component 104 can include and/or be associated with an object builder component 302, which can receive code 304 from a programmer and class definitions 306. Given the code 304 and definitions 306, the target object 106 can be built by the object building component 302 according to the received strategy. Such use of composition strategies enables object-oriented programmers to complete highly complex and difficult tasks in a much more efficient manner when compared to conventional frameworks.

The system 300 can further include a policy interrogator component 308 that can receive and interrogate a user-defined policy. For example, the policy can specify whether the strategy is to be employed a single time or for several instances. The implementation component 104 can further determine and/or receive a context associated with the target object 106, where the context refers to a set of entities in an application, such as existing object instances, policy and type definitions, configuration of the application, etc. The system 300 allows for multiple styles and requirements of composition by delegating actual composition work to one or more composition strategies. For instance, each strategy may be responsible for a particular style of composition. The received strategy may allow external entities to alter its behavior by way of policy, wherein the policy can be provided by programmatic, declarative, or configuration-based means. The policy interrogator component 308 can interrogate such policy to determine whether it is a permanent policy and/or a transient policy. Permanent policies remain constant between multiple composition executions while transient policy exists for a single execution of a builder. Transient policy can override or extent policies provided to the composition strategies.

Composition strategies implemented by the system 300 can be extended, wherein the extensions can be built and employed independently. Further, extensions can be independent or interdependent. In a particular exemplary use of the system 300, patterns of factory, builder, and chain of responsibility are well understood, and have been applied to solve composition problem as illustrated in existing dependency injection containers and proxying factories. The system 300 enables extensibility in a manner in which composition occurs, as strategies that are implement the composition can be independently build and used without requiring alteration to consuming application or other strategies.

In a particular example, the system 300 can be supported for .NET events, thereby allowing a class author to decorate an event with a publisher attribute that specifies the event's topic. Another class author can decorate an event handler with a subscriber attribute specifying the same topic. At runtime, the framework described herein can be employed to create and wire up instances of these classes without any intervention from calling code. In other words, the object builder component 302 can create and wire up instances of classes. For example:

```
public class PublisherClass
{
    [EventPublisher("MyTopic")]
    public event EventHandler MyTopicEvent;
    //Do something that fires the event...
}
public class SubscriberClass
{
    [EventSubscriber("MyTopic")]
    public void HandleMyTopicEvent(object sender, EventArgs e)
    {
    //Do something with the event
    }
}
```

The above illustrates an exemplary strategy that can be utilized by the system 300 to perform wire-up of the event to the handler when objects are created.

In another example, the definitions 306 can include the following C# class definitions:

```
public class ParentClass
{
    private ChildClass child;
    public ParentClass( ChildClass child )
    {
        this.child = child;
    }
    public ChildClass Child
    {
        get { return child; }
    }
}
public class ChildClass
{
}
```

The received strategy can be employed to provide a class that would allow the exemplary code 304 below to generate a new instance of ParentClass automatically populated with an instance of ChildClass.

In more detail, the following test case illustrates generation of the above-described new instance utilizing a class called ObjectBuilderContainer that provides an implementation of the claimed subject matter that may be populated with a set of strategies to provide simple constructor-based dependency injection.

[Test]

```
public void ConstructorDependencyInjectionTest( )
{
    ObjectBuilder builder = new ObjectBuilder( );
    ParentClass parent = builder.Build<ParentClass>( );
    Assert.IsNotNull (parent.Child );
}
```

Extending this example, such code (building code) can be extended by adding an additional strategy that uses reflection to locate an attributed method and execute such method.

```
public class SomeClass
{
    public bool MethodInvoked = false;
    [InvokeMethod]
    public void DoSomething ( )
    {
        MethodInvoked = true;
    }
}
```

[Test]

```
public void MethodInvocationStrategyTest ( )
{
    ObjectBuilder builder = new ObjectBuilder( );
    builder.AddStrategy( new MethodInvocationStrategy( ) );
    SomeClass result = builder.Build<SomeClass>( );
    Assert.IsTrue( result.MethodInvoked );
}
```

It can be discerned that behavior of the builder was quickly and easily modified by adding a strategy to the builder prior to use of such builder.

From the previous examples, it can be determined that the system 300 can implement strategies to perform tasks such as constructor dependency injection, setter injection, registration and storage in a container, lookup from a container, type mapping, attribute reflection, proxy return, and other suitable tasks. In addition to simple strategies shown above, some strategies may employ policy to be configured. For example, a user in a particular instance may use policy to configure some strategies. For instance, the user may desire to perform setter injection on particular properties. In this case, the user might provide a policy (analyzed by the policy interrogator component 308) indicating how the strategy should be implemented by the implementation component 104. For example:

```
public class Person
{
    private string name;
    public string Name
    {
        get { return name; }
        set { name = value; }
    }
}
```

[Test]

```
public void PropertyPolicyTest
{
    ObjectBuilder builder = new ObjectBuilder( );
    builder.AddStrategy( new PropertySetterStrategy( ) );
    builder.AddPolicy( new PropertyPolicy( "Name", "John Doe" ) );
    Person result = builder.Build<Person>( );
    Assert.AreEqual( "John Doe", result.Name );
}
```

This policy is a permanent policy, in that for every run of the builder, a class that has a string property named "Name" will be set to "John Doe". It is understood, however, that the system 300 (and other systems described herein) can support policies utilized for single runs of the builder. For example:

[Test]

```
public void TransientPolicyTest
{
    ObjectBuilder builder = new ObjectBuilder( );
    Builder.AddStrategy( new PropertySetterStrategy( ) );
    PropertyPolicy johnPolicy = new PropertyPolicy( "Name", "John Doe" );
    Person john = builder.Build<person>( johnPolicy);
    PropertyPolicy samPolicy = new PropertyPolicy( "Name", "Sam Smith" );
    Person sam = builder.Build<Person>( samPolicy );
    Assert.AreEqual( "John Doe", john.Name );
    Assert.AreEqual( "Sam Smith", sam.Name);
}
```

Figure 4:
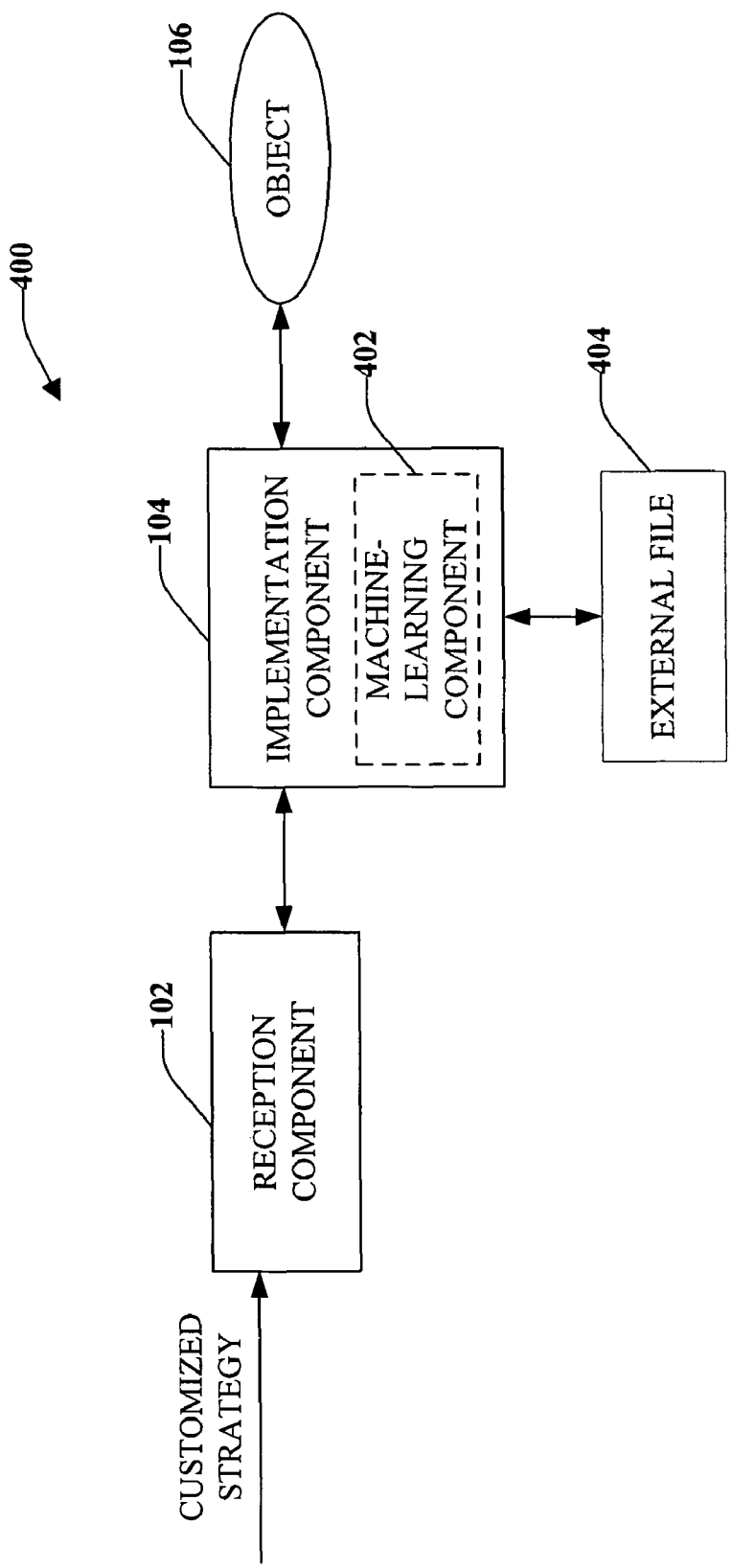
FIG. 4 is a block diagram of a system that facilitates generating inferences.

Now turning to FIG. 4, a system 400 that facilitates consolidating and encapsulating common patterns that occur in object-oriented programming is illustrated. The system 400 includes the reception component 102 that receives a strategy and the implementation component 104 that implements such strategy at runtime of an application. In one utilization of the system 400, the strategy can relate to constructor dependency injection, which is associated with discovering requirements of a class's constructor at run-time, resolving those requirements to determine objects that need to be retrieved or created, and passing them into the constructor for the object when the object itself is created. Constructors in object-oriented programming are methods utilized to create a new instance of an object, and can require certain parameters. Constructor dependency injection is the idea that methods needed by the constructor can be inferred so that a developer consuming the class doesn't need to explicitly define such methods. Accordingly, the requirements are injected into the constructor method call as an object is created based upon an inferred parameters list, wherein a machine-learning component 402 associated with the implementation component 104 can generate the inferences.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, . . . ) can be employed in connection with performing automatic and/or inferred action.

In one particular example, the inference can be controllable through strategy and policy. Thus, inference can be accomplished by analyzing attribute declarations that can be applied to parameters of a constructor. In another example, inference can be undertaken by the machine-learning component 402 through simple inspection of object types (in analyzing a context). Still further, metadata can be provided to a strategy (which can be perceived as advice to the strategy), enabling the machine-learning component 402 to make better decisions regarding such determination. The metadata can, for example, be provided in the form of an external file 404 (e.g., an external XML configuration file). In another example, the metadata can be in the form of advice given by the programmer within code. In still another example, the metadata can be obtained from an attributal language, such as .NET. Thus, any suitable manner for receiving and/or providing metadata is contemplated and intended to fall under the scope of the hereto-appended claims. Moreover, while the system 400 is described with respect to constructor dependency injection, it is understood that inference can be undertaken with respect to wire-ups, setter injection, registration and storage in a container, lookup from a container, type mapping, attribute reflection, returning proxy objects, and the like.

Referring now to FIGS. 5-13, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
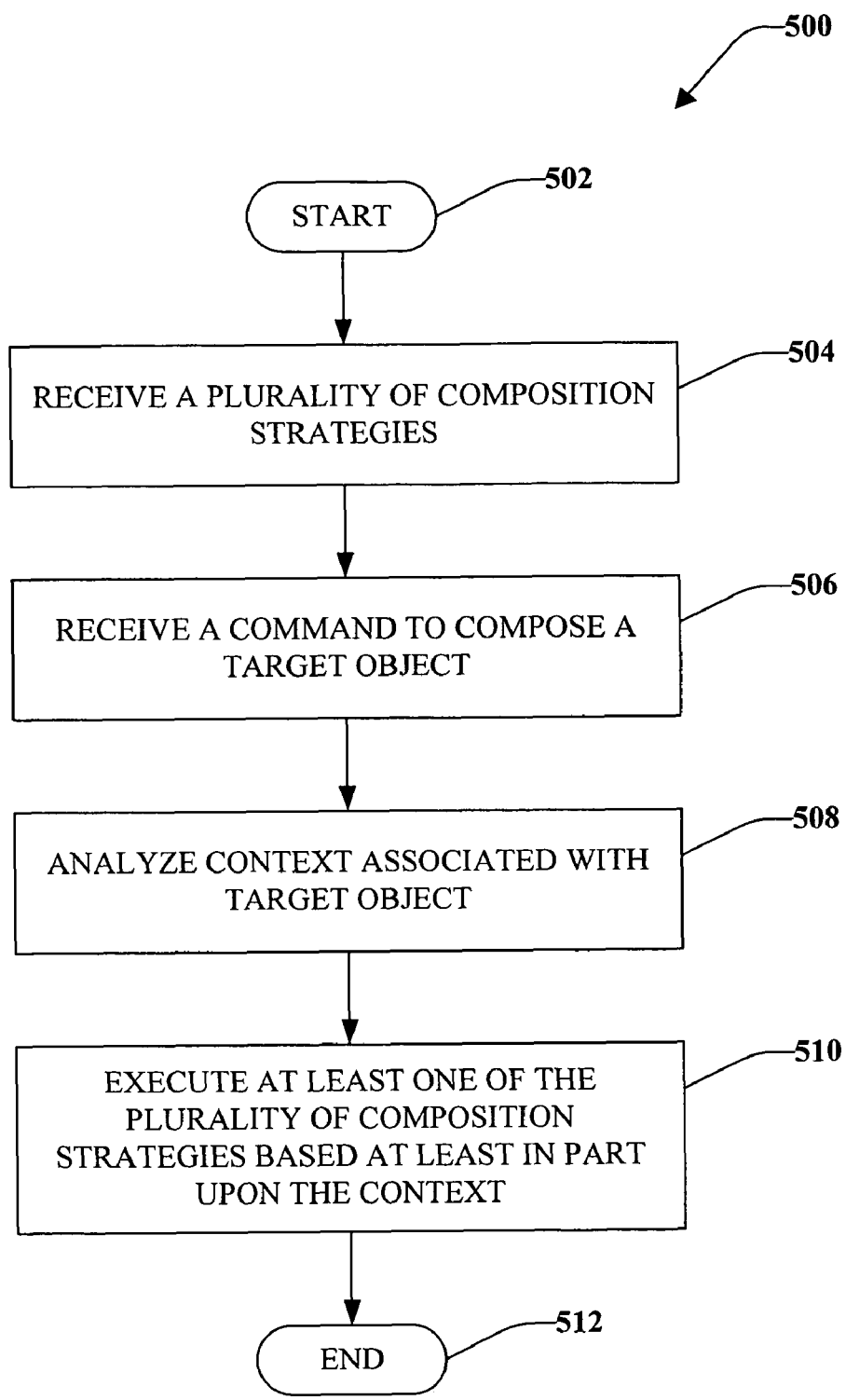
FIG. 5 is a representative flow diagram of a methodology for composing an object in an application.

Referring specifically to FIG. 5, a methodology 500 for composing one or more objects that conform to object-oriented programming is illustrated. The methodology 500 begins at 502, and at 504 a plurality of composition strategies are received. These strategies can be customized by a user and can be dependent or interdependent on other strategies. At 506, a command to compose a target object is received. For example, initiation of an application can cause a request for a composition to occur at run-time of such application. At 508, context associated with the target object can be analyzed, wherein context relates to existing entities, relationships, instances, classes, and the like that are associated with the application. At 510, at least one of the plurality of composition strategies are executed based at least in part upon the context. For instance, the composition strategies can relate to creating an object, modifying references, creating relationships, or any other suitable action. Moreover, the composition strategies can be independent or dependent upon one or more disparate strategies, and can be executed in particular orders depending upon context and/or policy. The methodology 500 then completes at 512.

Figure 6:
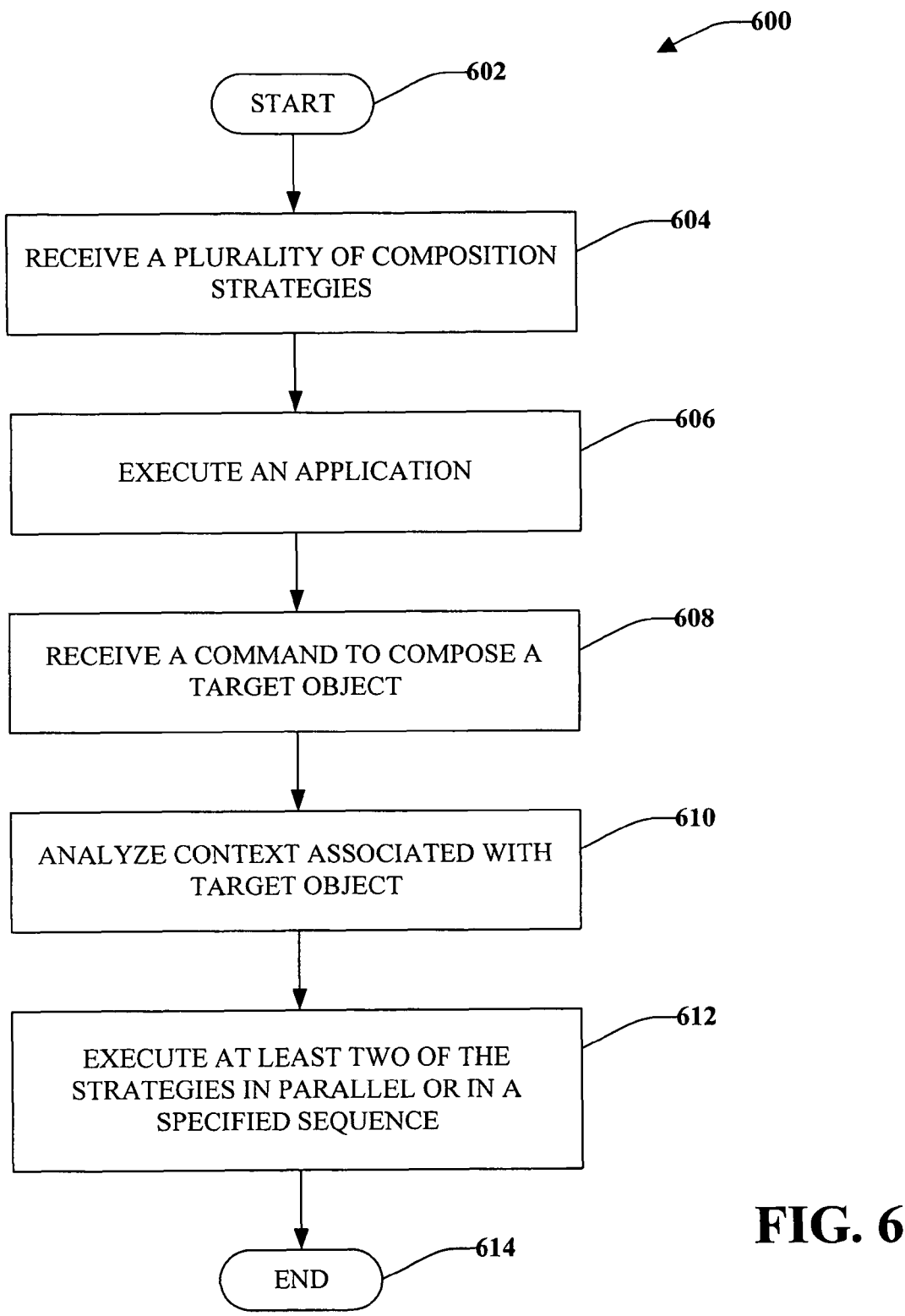
FIG. 6 is a representative flow diagram of a methodology for determining sequencing of strategies in connection with composing one or more objects.

Referring now to FIG. 6, a methodology 600 for composing an object through an extensible framework is illustrated. The methodology 600 begins at 602, and at 604 a plurality of composition strategies are received. Multiple styles and requirements of composition can be effectuated by delegating actual composition work to a subset of the plurality of strategies. Further, each of the strategies can relate to a particular style of composition, and may or may not rely on other composition strategies running before or after to fulfill its work. At 606, an application is executed, and at 608 a command to compose a target object is received. The command can be automatically generated upon executing the application, for example. Moreover, the command can be generic in that no target object currently exists, but rather composition strategies are run on a plurality of objects (thus the strategies are executed generically, and the command does not initially relate to a particular object). At 610, a context associated with the application is determined, wherein the context includes entities within or related to such application as well as application configuration. At 612, at least two of the plurality of composition strategies are executed based at least in part upon the context, wherein such strategies can be executed in parallel or sequentially (in a particular order). For instance, depending upon the context, a first composition strategy may require that a second composition strategy precede such first strategy. Accordingly, the second composition strategy should be implemented prior to the first composition strategy. In a similar manner, a first composition strategy may require a second composition strategy to be executed in parallel. The methodology 600 then completes at 614.

Figure 7:
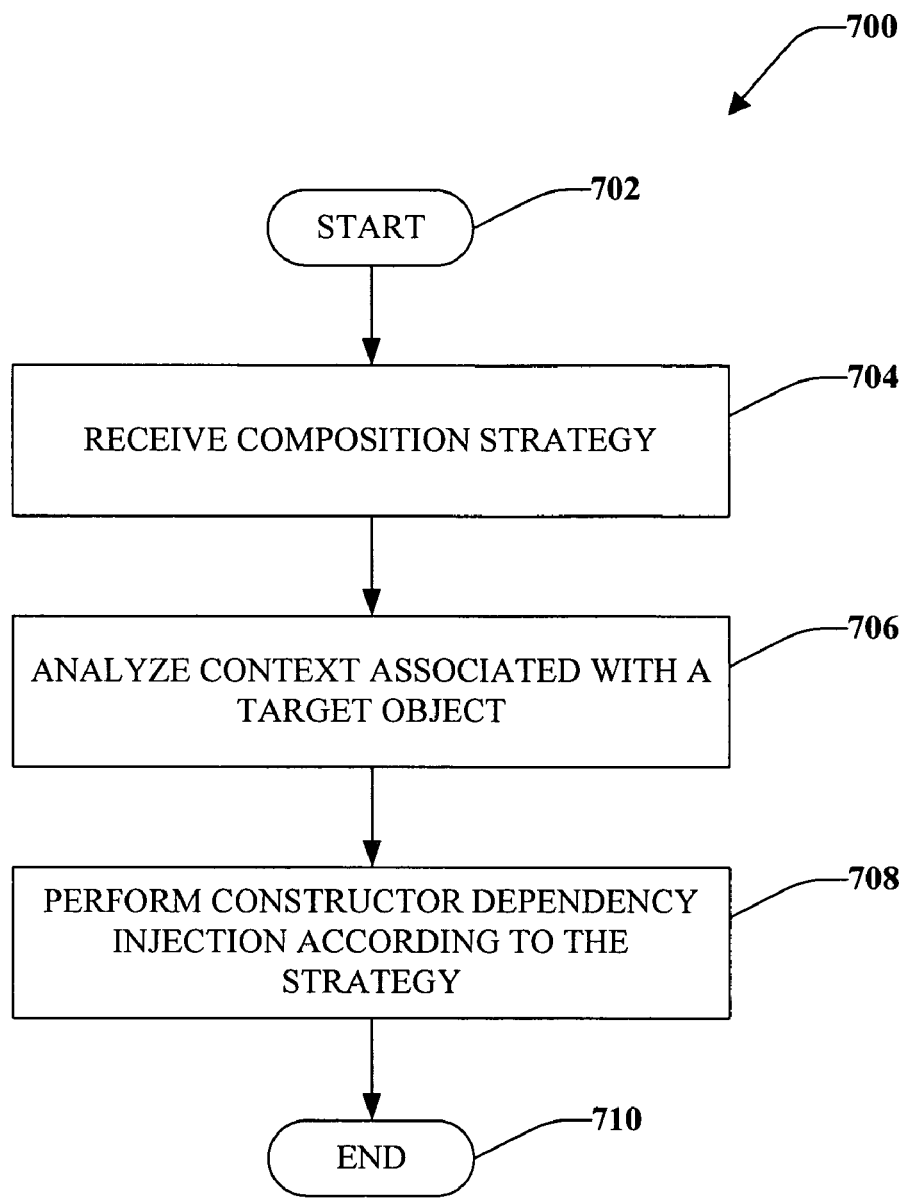
FIG. 7 is a representative flow diagram illustrating a methodology for performing constructor dependency injection according to a composition strategy.

Referring collectively to FIGS. 7-13, various tasks that can be performed through strategy are described. While illustrated separately, it will be understood by those skilled in the art that multiple strategies can be provided that relate to a combination of any or all of the methodologies described in these figures. Turning specifically to FIG. 7, a methodology 700 for undertaking constructor dependency injection through utilization of one or more strategies is illustrated. The methodology 700 begins at 702, and at 704, a composition strategy is received, wherein the strategy is intended to be utilized in connection with constructor dependency injection. At 706, a context associated with a target object is analyzed. In the methodology 700, the target object may be an object instance that is desirable created. At 708, constructor dependency injection is performed according to the received strategy (or strategies). As described above, constructor dependency injection relates to discovering requirements of a class's constructor at runtime, resolving such requirements to determine objects that should be retrieved or created, and then passing such objects to the constructor for the target object when such object is created. Constructors in object-oriented programming are methods utilized to create new instances of an object, and can receive parameters. The strategy can be designed in such a way that it can automatically be inferred what is passed to the constructor, wherein the inference is controllable through strategy and policy. The methodology 700 completes at 710.

Figure 8:
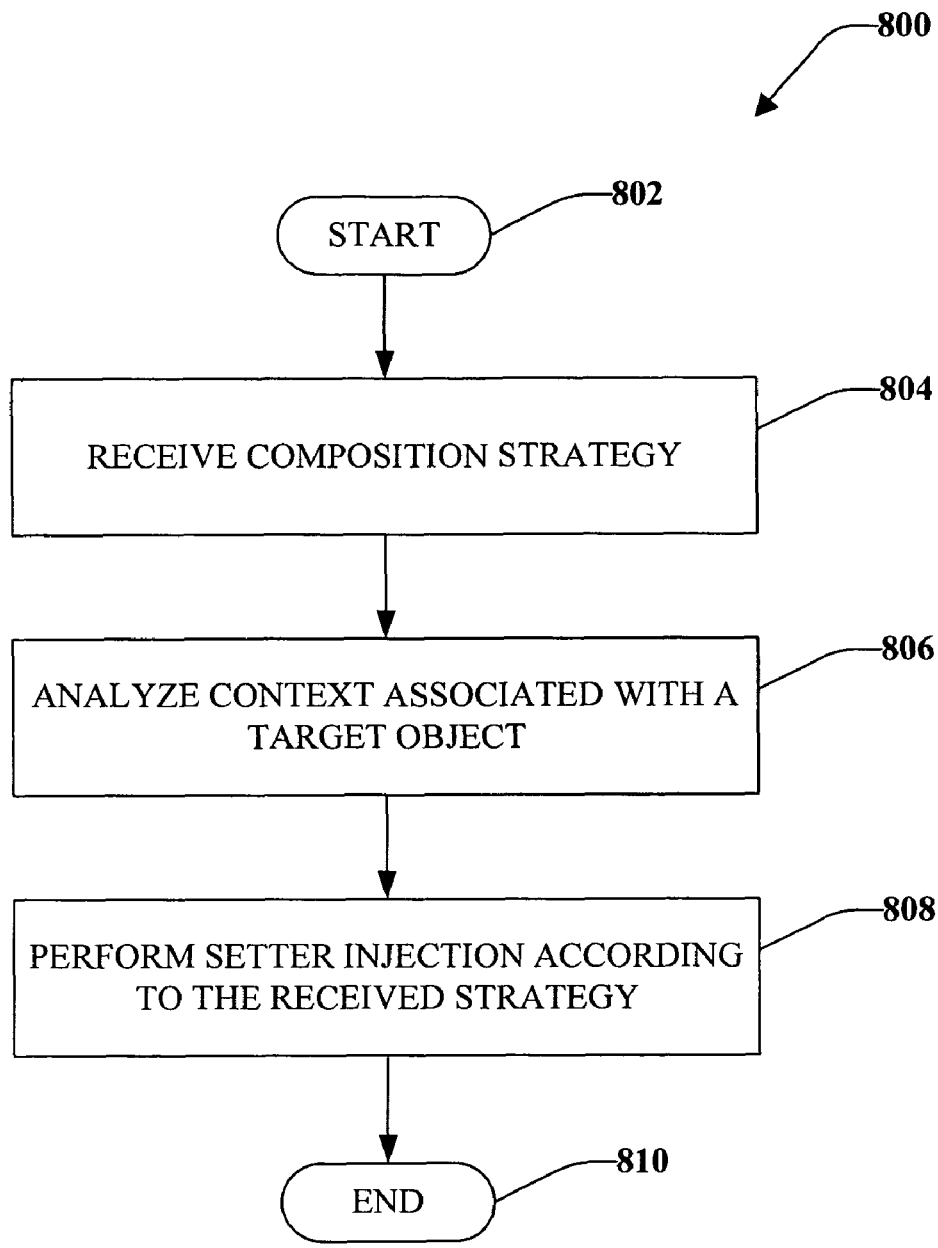
FIG. 8 is a representative flow diagram illustrating a methodology for performing setter injection according to a composition strategy.

Referring now to FIG. 8, a methodology 800 for undertaking setter injection through utilization of a strategy is illustrated. The methodology 800 begins at 802, and at 804 a composition strategy is received, wherein such strategy can be employed in connection with setter injection. Setter injection relates to automatically setting properties and calling methods on a created object. Setter injection is similar to constructor dependency injection, except that with respect to setter injection the at-issue object already exists. Inferring which properties to set and which methods to call, however, can be accomplished through inference. As described above, such inference can be based upon analyzing types of objects in a context, metadata associated with the object (e.g., in an XML configuration file, in code provided by a developer, . . . ). At 806, a context associated with a target object is analyzed. For instance, analysis of the context can provide metadata that is utilized in connection with the above-described inference. At 808, the setter injection is performed upon the target object. The methodology 800 then completes at 810.

Figure 9:
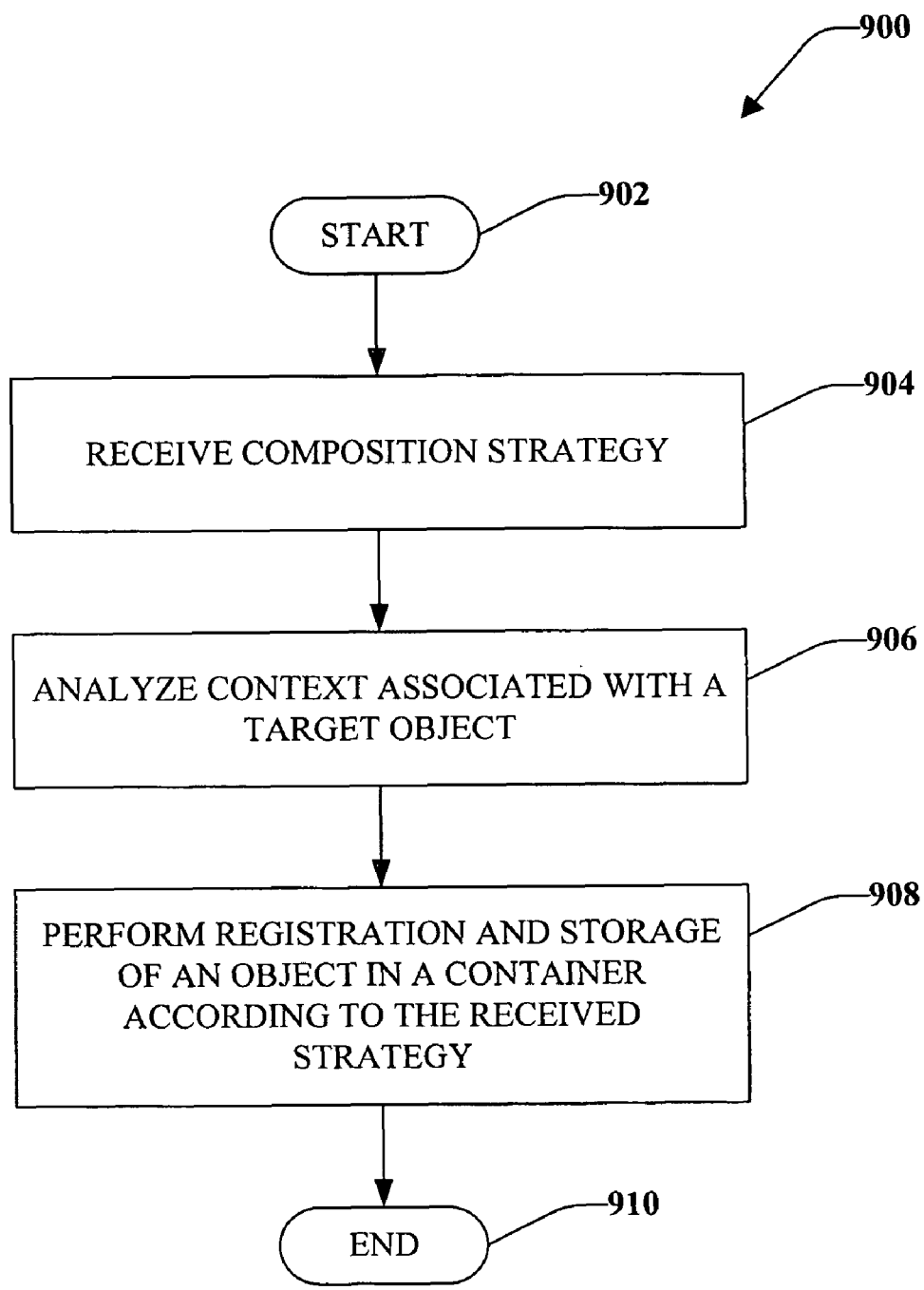
FIG. 9 is a representative flow diagram illustrating a methodology for registering and storing a target object in a container according to a composition strategy.

Now turning to FIG. 9, a methodology 900 for registering an object and storing it in a container based upon a strategy is illustrated. The methodology 900 starts at 902, and at 904 a strategy is received. The strategy can relate to registering a target object, wherein such object can be newly created and/or pre-existent (the object is the target object). At 906, a context associated with such object is analyzed to obtain metadata relating to the target object. The metadata can then be employed in connection with the strategy. At 908, registration and storage of the target object is performed according to the strategy. Registration and storage of an object into a container refers to notifying a system that the object should be remembered for future utilization. Thus, when a requirement for an object is resolved through inspection, containers can be parsed to determine if a pre-existent object is suitable for a particular need or if it is desirable to create a new object. As described above, the strategy can be associated with one or more inferences, can be run according to analyzed metadata, and/or can be operated according to specific commands. For example, if a programmer explicitly states that an object should be registered and stored, then the strategy can be run accordingly. The methodology 900 then completes at 910.

Figure 10:
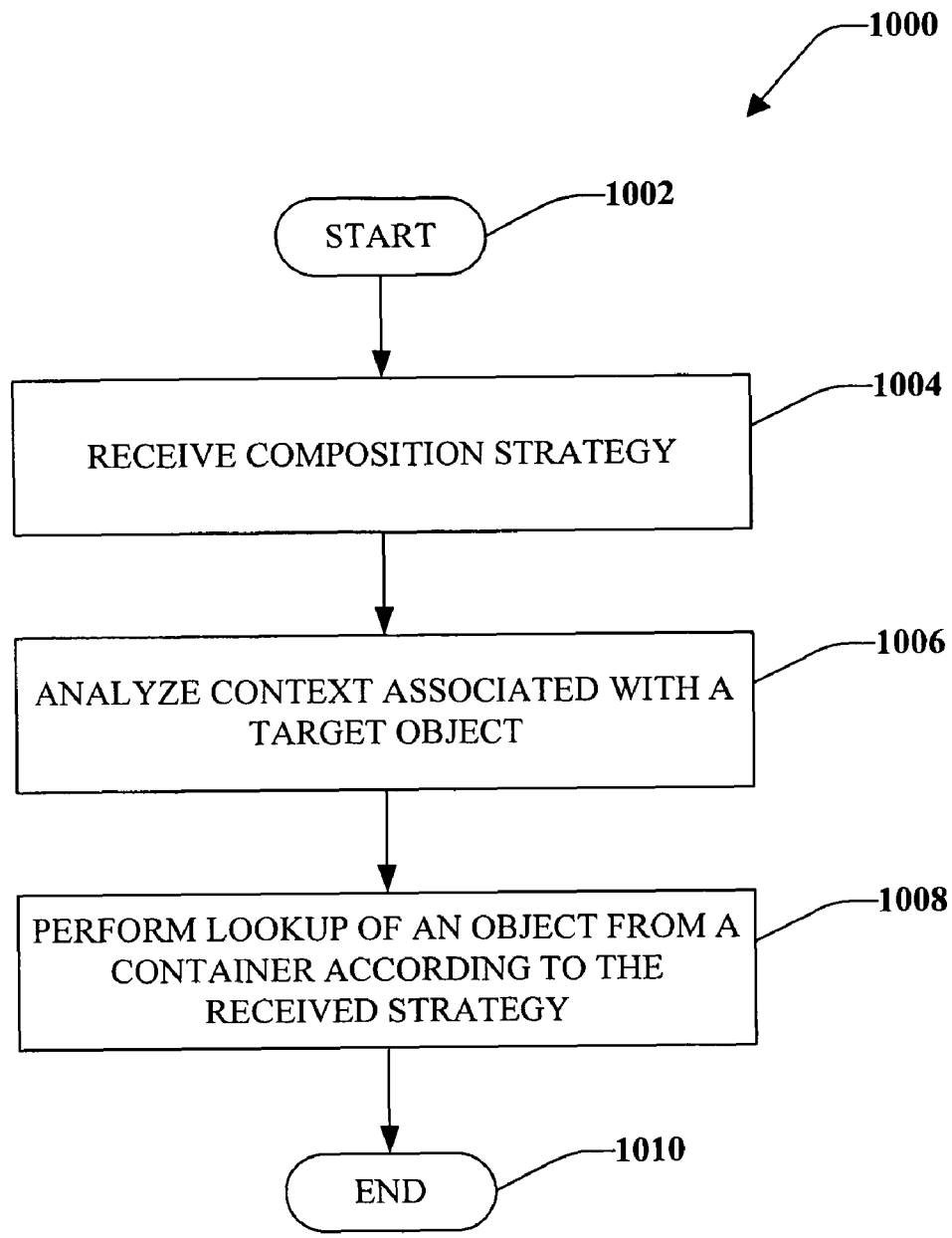
FIG. 10 is a representative flow diagram illustrating a methodology for locating a target object from within a container according to a composition strategy.

Referring now to FIG. 10, a methodology 1000 for looking up an object within a container based upon a received strategy is illustrated. The methodology 1000 starts at 1002, and at 1004 a strategy relating to looking up an object within a container is received (e.g., a target object). At 1006, a context associated with the target object is analyzed, and at 1008 an object lookup from a container is performed according to the strategy. Retrieving an object from a container relates to determining through inference, metadata, explicit commands, or a combination thereof whether an object should be retrieved from a container or whether a new object should be created. The methodology 1000 completes at 1010.

Figure 11:
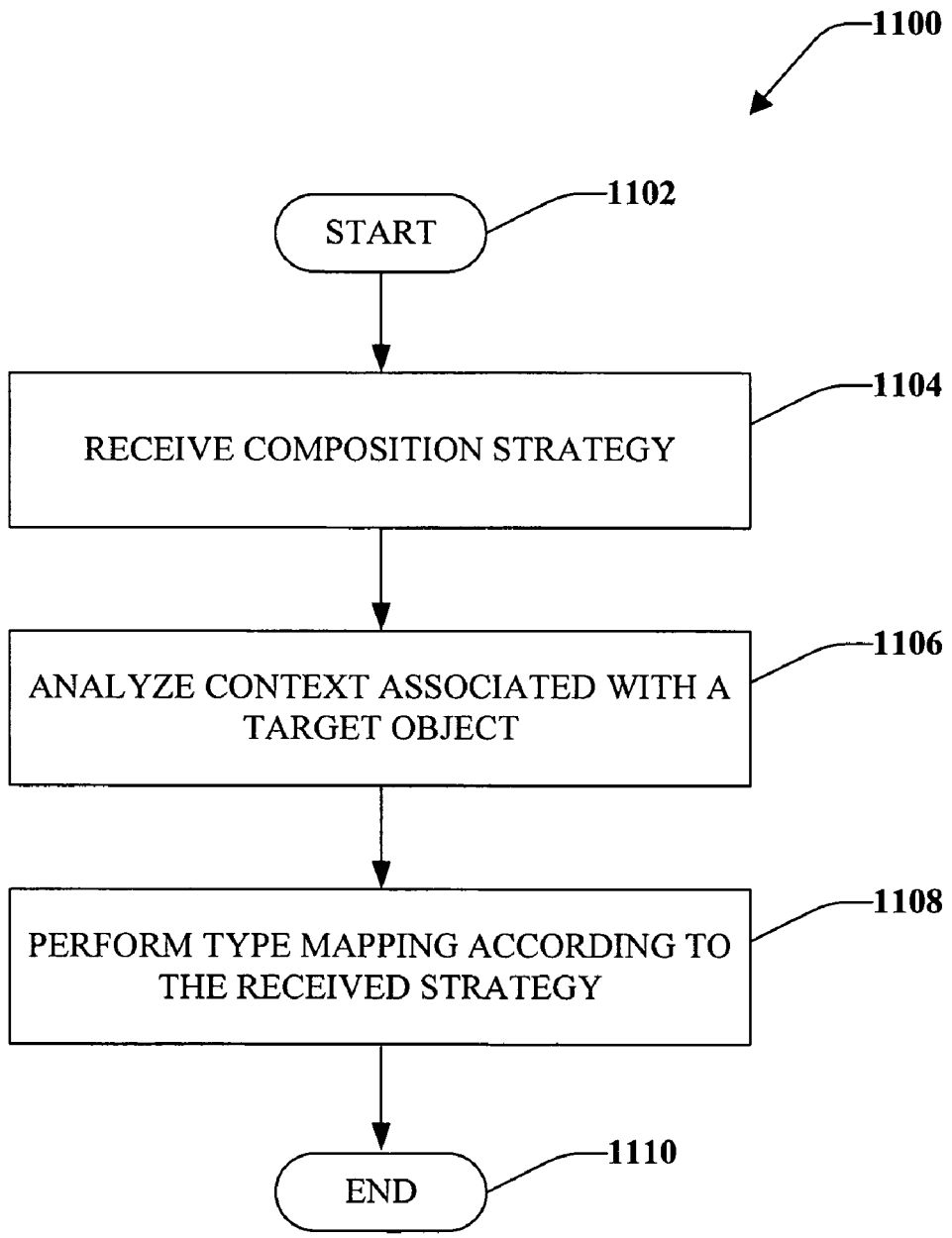
FIG. 11 is a representative flow diagram illustrating a methodology for performing type mapping with respect to a target object according to a composition strategy.

Turning to FIG. 11, a methodology 1100 for performing type mapping given a certain strategy is illustrated. The methodology 1100 starts at 1102, and at 1104 a composition strategy relating to type-mapping is received. Type mapping relates to interfaces and concrete classes, where an interface is a definition of a public method with respect to a particular class. Through polymorphism, another class may only need to know that an object being provided conforms to the interface. In more detail, a type of the object may be irrelevant so long as such object is associated with particular methods. Furthermore, type mapping can relate to converting a requested type into a more specific concrete type. At 1106, a context is analyzed with respect to a target object, and at 1108 type mapping is performed according to the strategy. The methodology 1100 then completes at 1110.

Figure 12:
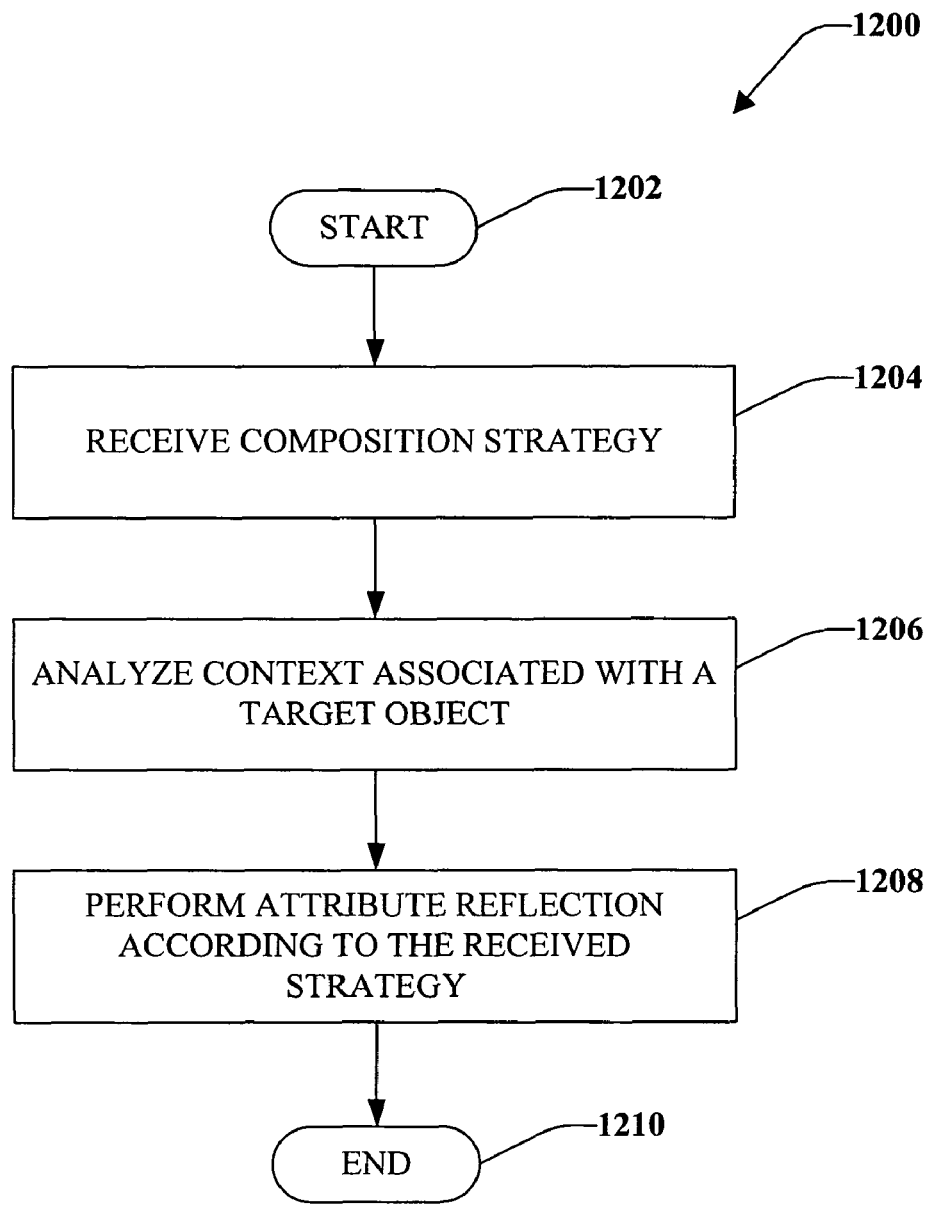
FIG. 12 is a representative flow diagram illustrating a methodology for performing attribute reflection with respect to a target object according to a composition strategy.

Referring now to FIG. 12, a methodology 1200 for performing attribute reflection according to a received composition strategy is illustrated. The methodology 1200 starts at 1202, and at 1204 a customized composition strategy relating to attribute reflection is received. Attribute reflection enables automatic discovery and configuration of one or more strategies by reflecting over a class being built. This can be enabled through utilization of any language that supports attributes, such as .NET. At 1206, a context associated with a target object is analyzed. In this example, the context can be a particular class associated with the target object. At 1208, attribute reflection is performed according to the received strategy, and the methodology 1200 then completes at 1210.

Figure 13:
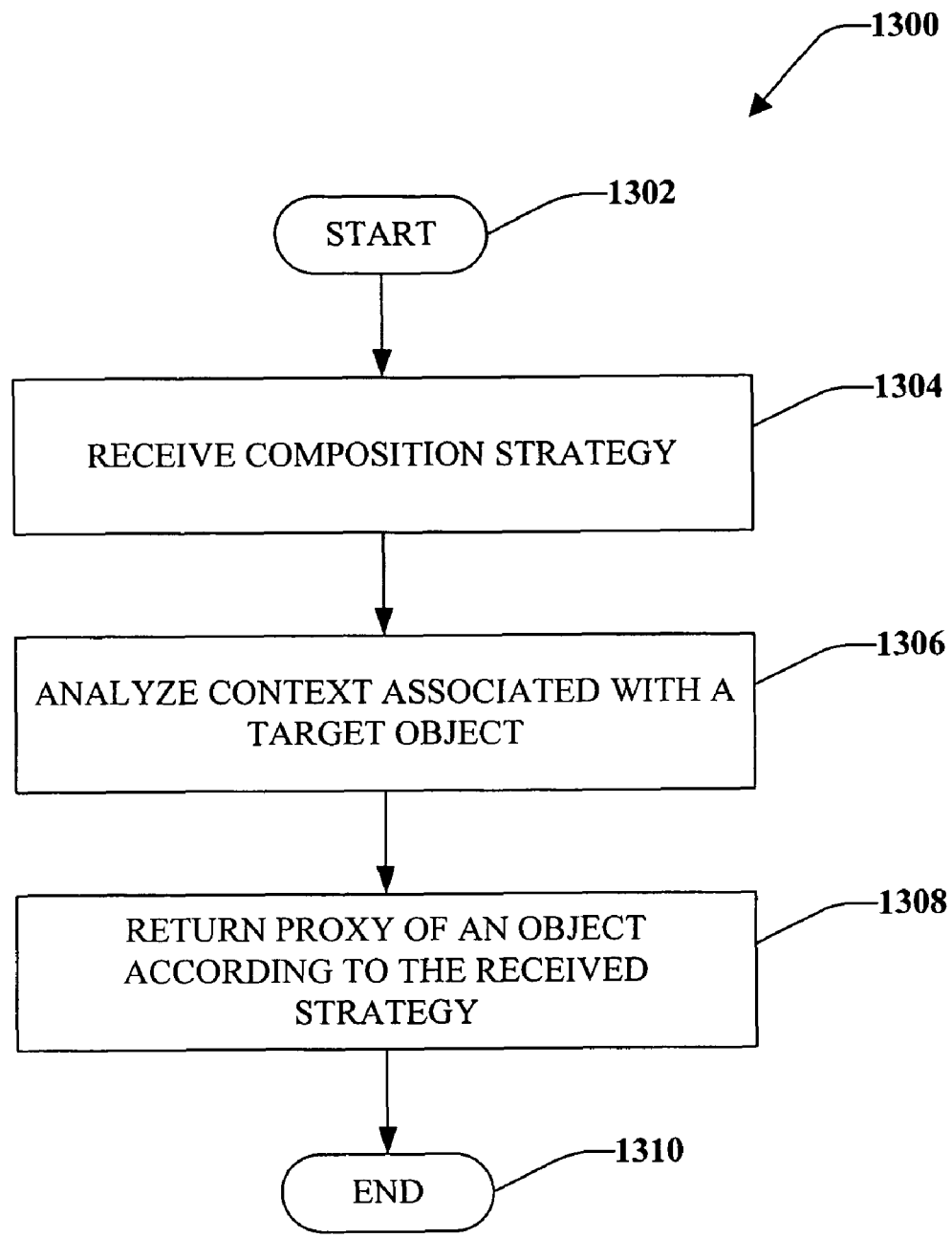
FIG. 13 is a representative flow diagram illustrating a methodology for providing a proxy object according to a composition strategy.

Turning now to FIG. 13, a methodology 1300 for returning a proxy object is illustrated. A proxy object can be returned as an object that provides a different implementation of a method declared in a target object. Proxying is known in the art, but heretofore undertaking proxying was not available through utilization of strategies. The methodology 1300 starts at 1302, and at 1304 a composition strategy relating to providing a proxy of an object is received. At 1306, a context associated with the object (the target object) is analyzed, and at 1308 the proxy object is provided according to the strategy. The methodology 1300 then completes at 1310.

Figure 14:
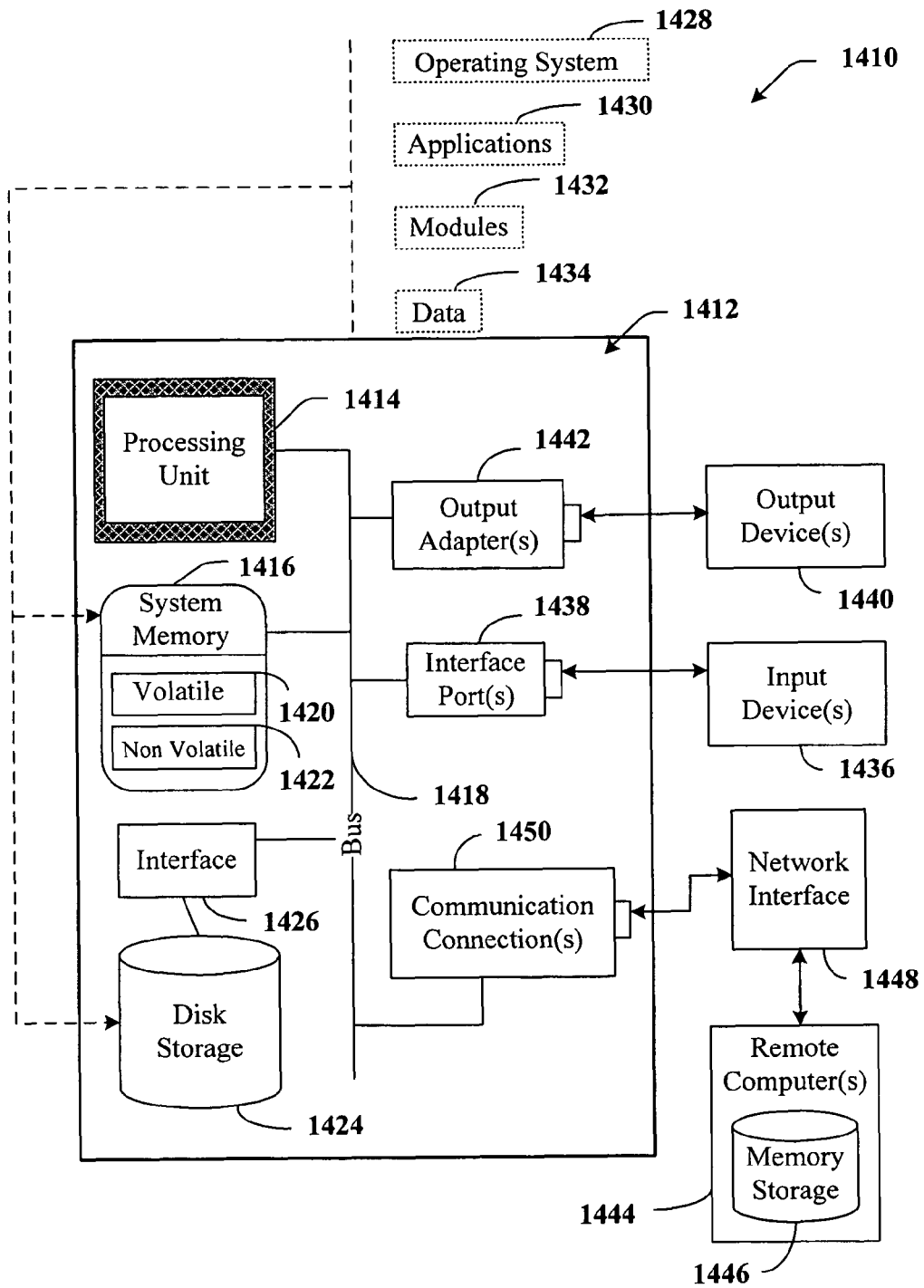
FIG. 14 is a schematic block diagram illustrating a suitable operating environment.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
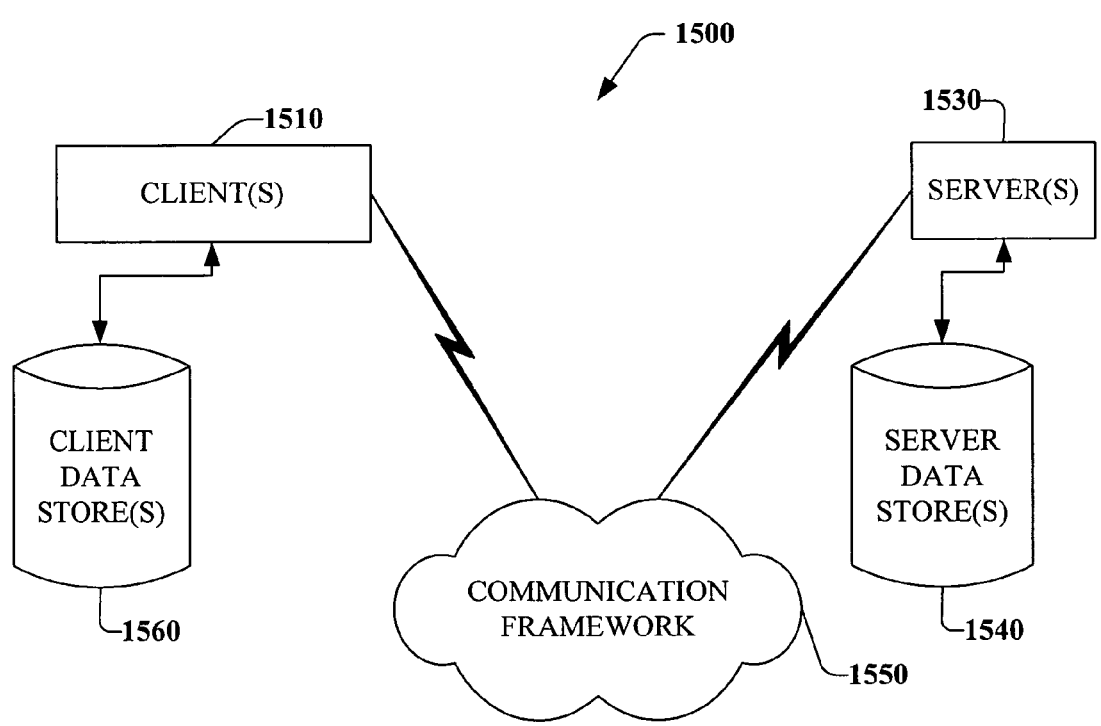
FIG. 15 is a schematic block diagram of a sample-computing environment.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for automatically building objects and automatically defining a relationship between objects based upon context during runtime of an application using the objects, the system comprising:
one or more computer storage media having stored thereon:
a reception component that, when executed by a processor, receives a customized composition strategy given in a context associated with a target object, wherein the received customized composition strategy is independently built and used, without requiring changes to a consuming application and without requiring changes to other strategies of a plurality of customized composition strategies;
an implementation component that automatically implements the customized composition strategy to create the target object based at least in part upon the context associated with the target object, wherein:
the context associated with the target object is based on a current context of the consuming application separate from the reception and implementation components that uses the target object, the consuming application being at runtime such that the current context corresponds to a runtime context of the consuming application; and
a framework associated with implementing the customized composition strategy allows for an addition of new customized composition strategies and defines a use for such strategies, and such that creation of the target object is performed during runtime of the consuming application;
an ordering component that facilitates execution of the customized composition strategy in an order that is determined by the context associated with the target object, such that the customized composition strategy is ordered for execution in a different order with respect to the other strategies of the plurality of customized composition strategies when the consuming application has different contexts at runtime; and
a context component that determines the context associated with the target object, wherein the context associated with the target object includes context of the application associated with the target object, existing objects associated with the target object, and relationships between the existing objects, wherein the context is a set of components that are relevant to the application and the target object at runtime of the consuming application, and at least one of the existing objects is a remote object.

2. The system of claim 1, wherein the reception component receives the plurality of customized composition strategies.

3. The system of claim 2, wherein the ordering component facilitates execution of the plurality of customized composition strategies based on the context associated with the target object.

4. The system of claim 1, wherein the customized composition strategy is a permanent policy or a transient policy.

5. The system of claim 1 configured to employ inferences in connection with composing the target object.

6. The system of claim 5, wherein the inferences generated are based at least in part upon one or more of analyzed metadata and explicit commands.

7. The system of claim 5, further comprising an external configuration file that is employed in connection with generating the inferences.

8. An extensible method for composing an object comprising based upon a current context of a run time application, the method comprising:
executing the following computer executable acts on a processor:
receiving a call from an application at run time of the application, wherein the call includes at least a request for at least one composition strategy and a specification of default policies associated with the composition strategy;
receiving the a plurality of composition strategies;
receiving a command to compose a target object for the run time application;
determine a context associated with the target object, wherein the context associated with the target object includes a set of entities existing in the application and relevant to the application and the target application at run time when the call is received, including at least a context of the application for which the target object is composed, existing objects associated with the target object, and relationships between the existing objects, wherein at least one of the existing objects is a remote object;
composing an object based at least upon the context and the call, and during run time of the application; and
ordering the plurality of composition strategies based on the context and the call, such that the same plurality of composition strategies is ordered differently for different contexts of the application at run time.

9. The method of claim 8, further comprising executing at least two of the composition strategies in a parallel manner.

10. The method of claim 8, further comprising executing at least two of the composition strategies sequentially in a specified order.

11. The method of claim 8, further comprising performing one or more of constructor dependency injection and setter injection upon executing the at least one strategy.

12. The method of claim 8, further comprising performing one or more of registering the target object, storing the target object in a container and retrieving the target object from a container upon executing the at least one strategy.

13. The method of claim 8, further comprising performing at least one of type mapping with respect to the target object upon executing the at least one strategy and providing a proxy object to the target object upon executing the at least one strategy.

14. The method of claim 8, further comprising performing attribute reflection upon executing the at least one strategy.

15. An extensible system for object composition during run time of an application requesting composition of the object, and based on then current context of the application, the extensible system comprising:
one or more processors; and
one or more computer storage media having stored thereon computer executable instructions that, when executed by the one or more processors, causes the extensible system to:
receive a call from an application at run time of the application, wherein the call initiates a request for creation of at least one target object;
receive a chain of sequential composition strategies, wherein the chain of composition strategies relate to building the at least one target object;
implement the chain of composition strategies with respect to the at least one target object;
determine a context associated with the at least one target object, wherein the determined context associated with the at least one target object includes a current context of the application at run time of the application associated with the target object, and includes existing objects associated with the target object, relationships between the existing objects, and an identification of object instances running within the application, wherein the context is a set of components that are relevant to the application and the target object at run time of the application, and at least one of the existing objects is a remote object;

interrogate a policy, wherein the policy specifies rules for the implementation of the chain of composition strategies, and such that changes in run time context of the application change an order in which the chain of sequential composition strategies are used; and create the at least one target object based at least in part upon the received chain of composition strategies in the order determined by interrogation of the policy in view of the run time context of the application, wherein creating the at least one target object includes ordering the chain of composition strategies based on the context of the application at run time, such that the same chain of composition strategies is ordered differently for at least two different contexts of the application at run time.

* * * * *

UNITED STATES PATENT AND TRADEMARK OFFICE
CERTIFICATE OF CORRECTION

| | | |
|---|---|---|
| PATENT NO. | : 7,779,043 B2 | Page 1 of 1 |
| APPLICATION NO. | : 11/321209 | |
| DATED | : August 17, 2010 | |
| INVENTOR(S) | : Eduardo A. Jezierski et al. | |

It is certified that error appears in the above-identified patent and that said Letters Patent is hereby corrected as shown below:

In column 18, line 11, in Claim 8, delete "the a" and insert -- a --, therefor.

Signed and Sealed this
Eighth Day of February, 2011

David J. Kappos
*Director of the United States Patent and Trademark Office*